Sept. 4, 1951   V. H. CARPENTER   2,567,101

MATRIX BAND FOR USE IN FILLING DENTAL CAVITIES

Filed June 8, 1949

Inventor
Victor H. Carpenter
by Wright, Brown, Quinby & May
Attys.

Patented Sept. 4, 1951

2,567,101

UNITED STATES PATENT OFFICE 2,567,101

MATRIX BAND FOR USE IN FILLING DENTAL CAVITIES

Victor H. Carpenter, Boston, Mass.

Application June 8, 1949, Serial No. 97,852

1 Claim. (Cl. 32—63)

In the practice of dentistry many cavities in the molars and bicuspid teeth are filled with soft amalgam or cement in plastic condition. Both types of filling material set and become hard after a short time but, when placed in large cavities, require external support to retain them in place while setting. Such support is furnished by a band of thin metal which is passed around the tooth in which the prepared cavity to be filled is located, and is drawn tight and held in place by a clamping tool.

Such bands (the technical name of which is matrix band), are made in various lengths and widths to suit teeth of different dimensions.

A practical disadvantage in the use of such matrix bands is that, being very thin and flexible, the band, in being tightened around a tooth containing a wide cavity, is stretched and flattened in the part which crosses the mouth of the cavity. Consequently, the filling which is formed with the aid of such a matrix band is molded with the outer surface flat, or nearly so, and with no curvature whatever in vertical planes. Sound teeth are convex in their contours, lengthwise as well as circumferentially, and make tangent contact with the adjacent teeth on narrowly limited areas. This is the general rule as to molars and bicuspids.

But when a filling is finished with the aid of a matrix which is stretched straight and flat, or approximately so, across the mouth of a cavity, the convexity which the tooth originaly had before being injured by caries is not restored. When the filling is located at the side of a tooth next to the adjacent tooth, the support which was afforded by the original tooth substance, by its contact with the adjacent tooth, is not restored by the filling, and the tooth then is displaced from its correct position, due to such lack of support and pressure of the teeth at the other side.

It is the object of this invention to provide a means by which soft fillings can be molded at the outer or exposed face with a convexity similar to, or approximating, that of the original tooth substance, or with such an amount of protuberance that it will bear on the next tooth in tangent contact like that of the tooth before it was decayed. This object is accomplished by the provision of matrix bands which are concave with a generally spherical curvature at the side which in use is placed next to the tooth, and in such a location that the concavity may be located across the orifice of a cavity. The location of the spherically concave area may be different in different matrix bands to permit selection of an appropriate band for a tooth of any width when the cavity is in any part of the circumference of the tooth, not only at the side adjacent to a contiguous tooth, but also at the lingual or the outer side.

The accompanying drawings show one embodiment of the invention in a matrix band designed for application to a molar having a cavity at the side next to the adjacent tooth.

In these drawings.

Figure 1:
Fig. 1 is a side view of the band in flat condition.
Figure 2:
Fig. 2 is a cross section taken on line 2—2 of Fig. 1.
Figure 3:
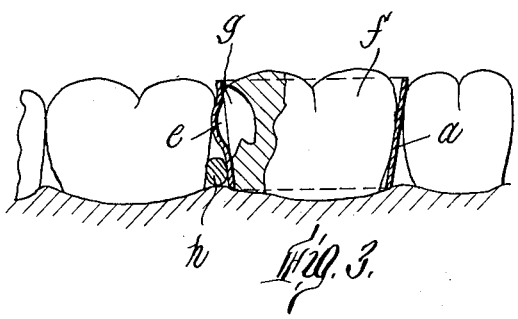
Fig. 3 is a fragmentary side view of part of a human jaw showing two molars and a bicuspid with the matrix band in place around one of the molars so that its spherical concavity registers with a cavity in the tooth.
Figure 5:
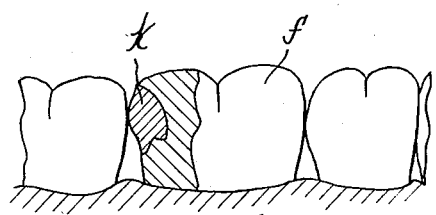
Fig. 5 is a view similar to Fig. 3 showing the molar with a filling in the cavity after removal of the matrix band.
Figure 4:
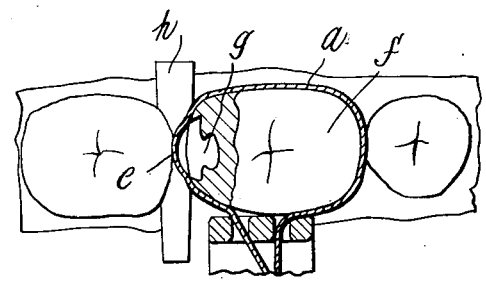
Fig. 4 is a plan view of the same.
Figure 6:
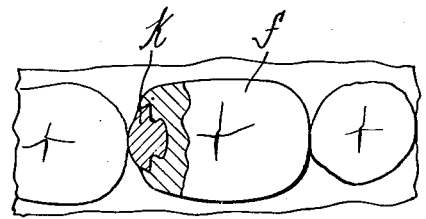
Fig. 6 is a plan view of the teeth shown in Fig. 5. In each of Figs. 3–6 the tooth containing the cavity is shown partly in section.
Figure 7:
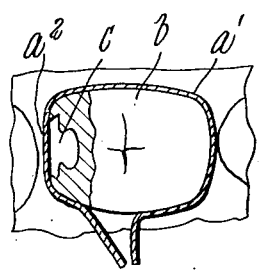
Figs. 7 and 8 show in plan view and partial section the mode of use and effect of matrix bands of the prior art.
Figure 8:
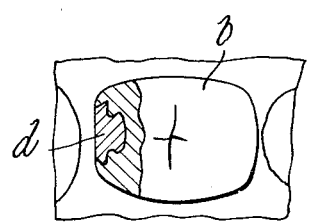

In Figs. 1 and 2 a matrix band $a$ is shown in flat condition, that is, the condition in which such bands are furnished by the makers to dentists. These bands are made of sheet metal having a thickness in the order of two to three thousandths of an inch and are highly flexible. Such a band can be passed around a tooth and crowded between that tooth and neighboring teeth, and pulled up tightly by means of a special tool provided for the purpose. When a band of the construction heretofore used is thus tightened around a tooth, that portion of its area which extends across the mouth of a prepared cavity is supported only at the rim of the cavity, and the tension applied to it causes it to be substantially straight and flat. This condition is shown in Fig. 7 where a tooth $b$ is shown in which there is a cavity $c$ in the side next to the adjacent tooth, and a matrix band $a'$ is drawn tight around the tooth. The part $a^2$ of the band which overlies the cavity is thus drawn out substantially straight and flat. If it has any curvature at all, the curvature is cylindrical, due to whatever elastic resilience the band may have, and there is no curvature in the direction of the height of the tooth, that is, transversely of the band. The result is that when a soft filling, such as that shown at $d$ in Fig. 8, is molded in the cavity, its outer face is essentially flat. After setting, and removal of the band, the filling retains its flat outer contour and fails to make supporting contact with the next tooth. Or it permits the tooth in which it is located to be canted or shifted out of position until the filling bears on the next tooth.

In accordance with this invention the matrix band is formed with a spherical concavity $e$ in one face. Incidentally a corresponding convexity is formed in the opposite face, but that is due only to the thinness of the metal and has no significance so far as the invention is concerned.

The concavity may be located at any point in the length of the band to correspond with the location of a cavity in any part of the circumference of a tooth; and the concavity may be of larger or smaller diameter and depth to correspond with cavities of different magnitudes. In the commercial practice of the invention, bands of a variety of lengths and widths, similar in those respects to the matrix bands heretofore used, are made and provided with concavities of various dimensions in various locations along the lengths of the bands, enabling the practitioner to select a band suitable for any particular piece of work.

Assuming that the specific band shown in Figs. 1 and 2 is adapted for use with the tooth $f$ shown in Figs. 3-6, in which there is a large cavity $g$ in the side next to another tooth, the band $a$ is passed around the tooth so that the concavity $e$ registers with the tooth cavity. A separator $h$ may be placed between these teeth in accordance with common practice to hold them apart sufficiently to give room for the bulge of the band. The cavity is then filled with plastic amalgam, or other suitable material. When the plastic material has become sufficiently hard, the band and separator are removed, leaving a solid filling $k$ which has a convexity of spherical contours sufficiently high to make tangent contact with the adjacent tooth and maintain the filled tooth in correct position.

In describing the concavity in the matrix band as being spherical, I have not meant to imply that it is necessarily the zone of a perfect sphere, but only that it is curved both laterally and longitudinally. It may be spheroidal or depart in other respects from the curvature of a perfect sphere. That is, the radii of curvature may be different in different directions and in different parts of the same arc.

What I claim is:

A matrix band consisting of an elongated strip of thin flexible sheet metal adapted to be passed around a tooth and across a cavity in a side of such tooth, said band having a slight longitudinal curvature, the midportion of the band being substantially wider than the end portions, said midportion being more than half the total length of the band, and a depression of generally spherical curvature in said midportion spaced from the edges thereof and so located that it may be placed in register with a cavity in the side of a tooth when the the band is drawn completely around the tooth.

VICTOR H. CARPENTER.

REFERENCES CITED

The following references are of record in the file of this patent:

UNITED STATES PATENTS

| Number | Name | Date |
|---|---|---|
| 1,265,581 | Zurbrigg | May 7, 1918 |
| 1,868,981 | Ivory | July 26, 1932 |
| 2,310,448 | Lieb | Feb. 9, 1943 |